United States Patent [19]

Dawson et al.

[11] Patent Number: 5,420,232
[45] Date of Patent: May 30, 1995

[54] PROCESS FOR MAKING POLYAMIC ESTERS

[75] Inventors: Daniel J. Dawson; Richard A. DiPietro, both of San Jose, Calif.

[73] Assignee: International Business Machines Corporation, Armonk, N.Y.

[21] Appl. No.: 875,878

[22] Filed: Apr. 29, 1992

[51] Int. Cl.⁶ .............................................. C08G 73/10
[52] U.S. Cl. .................... 528/353; 528/220; 528/229; 528/271; 528/272; 528/274; 528/332; 528/335; 528/336; 528/350; 528/351
[58] Field of Search .............. 528/332, 353, 350, 351, 528/335, 336, 272, 220, 229, 271, 274

[56] References Cited

U.S. PATENT DOCUMENTS

| | | | |
|---|---|---|---|
| 4,073,788 | 2/1978 | Peterson | 260/29.2 N |
| 4,225,702 | 9/1980 | Makino et al. | 528/353 |
| 4,485,234 | 11/1984 | Makino et al. | 528/329 |
| 4,551,522 | 11/1985 | Fryd et al. | 528/351 |
| 4,720,539 | 1/1988 | Rabilloud et al. | 528/353 |
| 4,736,015 | 4/1988 | Rabilloud et al. | 528/353 |
| 4,849,501 | 7/1989 | Diller et al. | 528/353 |

OTHER PUBLICATIONS

CA 75(6): 36745j; Aug. 9, 1971, Nishizaki et al.
CA 112(8): 58382y; Feb. 19, 1990, Diller et al.
CA 113(22): 192395d; Nov. 26, 1990, Yoon et al.
CA 117(4): 27291s; Jul. 27, 1992, Volksen et al.
CA 116(10): 84577t; Mar. 9, 1992, Kim et al.

Primary Examiner—John Kight, III
Assistant Examiner—P. Hampton-Hightower
Attorney, Agent, or Firm—Robert B. Martin

[57] ABSTRACT

The present invention relates to an improved process for making polyamic ester comprising reacting an aromatic diester diacid halide with the monohydrohalide salt of an aromatic diamine in the presence of a base. The polyamic ester can be imidized to form a polyimide suitable for use in electronic components.

2 Claims, No Drawings

PROCESS FOR MAKING POLYAMIC ESTERS

FIELD OF THE INVENTION

The present invention relates to an improved process for making polyamic esters which can then be imidized to form polyimides.

BACKGROUND OF THE INVENTION

Polyimides are known in the art for use in the manufacture of integrated circuits including chips (e.g. chip back end of the line), thin film packages and printed circuit boards. Polyimides are useful in forming dielectric interlayers, passivation layers, alpha particle barriers and stress buffers. Polyimides are particularly useful as an interlayer dielectric material to insulate the conductor wiring interconnecting the chips on a multichip module. This is known as thin-filmwiring. A multichip module is an intermediate level of packaging between the chips and the circuit board. Multichip modules are generally known in the art. Multichip modules are made up of multiple layers of power, signal and ground planes which deliver power to the chips and distribute the input/output signals between chips on the module or to/from the circuit board.

A particularly useful class of polyimides for electronic components is made by reacting phenylenediamine (PDA) with an aromatic dianhydride to form a polyamic acid. The polyamic acid is then thermally imidized at an elevated temperature to form the polyimide. Due to the oxidative reactivity of PDA which consequently results in a short shelf life, the PDA is preferably distilled directly into the reaction mixture immediately prior to the polymerization reaction. The use of the dihydrochloride salt of PDA, which is stable in air, is avoided because of the problem of corrosion with residue chloride contamination in the polyimide product. There is no commercially practical procedure for removing chloride from the resulting polyamic acid. There is still a need in the art for an improved process for making polyimides comprising PDA which does not require a cumbersome distillation of the starting material.

It is therefore an object of the present invention to provide an improved process for making polyimides.

Other objects and advantages will become apparent from the following disclosure.

SUMMARY OF THE INVENTION

The present invention relates to an improved process for making polyamic ester comprising reacting an aromatic diester diacid halide with the monohydrohalide salt of an aromatic diamine in the presence of a base. The halide. impurity in the resulting polyamic ester can be readily removed by water washing. The polyamic ester can then be imidized to form a polyimide which is suitable for use in electronic components. Preferably, the aromatic diamine is PDA. The present invention also relates to integrated circuits formed using the polyimide made by this process.

A more thorough disclosure of the present invention is presented in the detailed description which follows.

DETAILED DESCRIPTION OF THE INVENTION

The present invention relates to a process for making a polyamic ester comprising reacting an aromatic diester diacid halide with the monohydrohalide salt of an aromatic diamine in the presence of a base.

Suitable aromatic diester diacid halides for use in the present invention have the following formula:

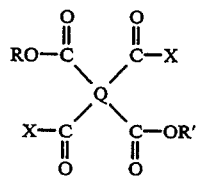

where each X is independently halo preferably chloro, and R and R' are each independently selected from alkyl or aryl and optionally substituted with suitable substituents which do not substantially interfere with the imidization nor adversely affect the final properties of the polyimide. Generally R and R' are the same and are suitably lower alkyl or haloalkyl, such as methyl, ethyl, or 2,2,2-trifluoroethyl, alkyl glycolyl or the like.

Suitable Q groups generally comprise tetravalent organic radicals selected from cycloalkyl, aromatic and aromatic heterocyclic wherein the aromatic generally has at least 6 carbon atoms characterized by benzenoid unsaturation and the four valencies are fixed by pairs on separate adjacent carbon atoms. When the aromatic radical comprises several rings connected together, the linking elements are for example a single bond or one of the following atoms or groups:

—O—; —S—; —SO—; —SO$_2$—; —CO—; —CHOH—; —CH$_2$—; —CF$_2$—; —C(CH$_3$)$_2$—; —C(CF$_3$)$_2$—; —COO—; —CONH—; —CO—O—(CH$_2$)$_2$—O—CO—; —Si(CH$_3$)$_2$—; —O—Si(CH$_3$)$_2$—O—,

Suitable Q groups include the following:

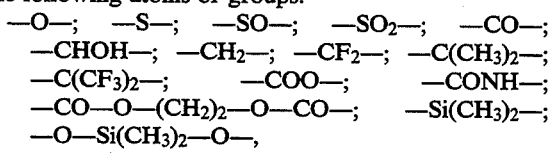

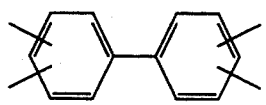

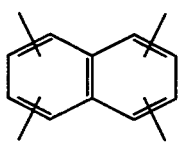

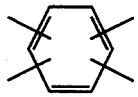

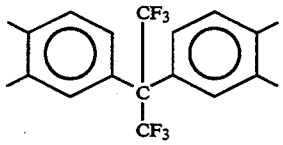

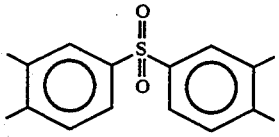

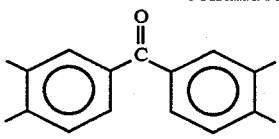

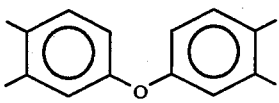

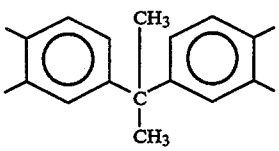

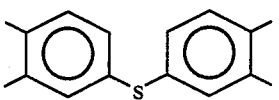

Other suitable Q groups will be known to those skilled in the art. Q may also be substituted with a variety of substituents known to those skilled in the art which do not substantially interfere with the imidization nor adversely affect the final properties of the polyimide. Preferred aromatic diester diacid halides include diethyl pyromellitate diacid chloride, diethylbiphenyltetracarboxylate diacid chloride, dimethyl biphenyltetracarboxylate diacid chloride, or di(methylacryloxyethyt) biphenyltetracarboxylate diacid chloride.

Suitable monohydrohalide salts of aromatic diamines have the following formula:

$$H_2N-Z-NH_2 \cdot HX$$

where X is halo, preferably chloro and Z generally comprise a monocyclic or polycyclic divalent aromatic radical in which the aromatic rings may be aromatic, heterocyclic, or directly attached rings, e.g., biphenylene and naphthalene. Suitable Z may be selected from

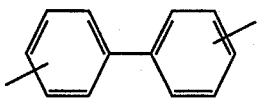

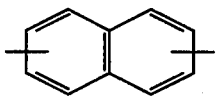

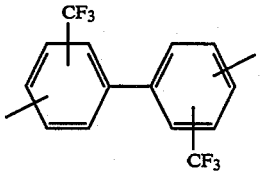

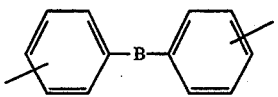

wherein B is selected from the group consisting of an alkylene chain having 1-3 carbon or halocarbon atoms. The aromatic radical can optionally be substituted by a variety of substituents such as alkyl, haloalkyl (e.g. trifluoromethyl), halo or the like. Suitable Z include:

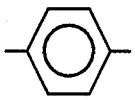

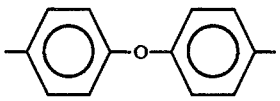

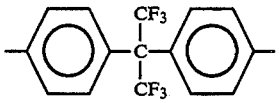

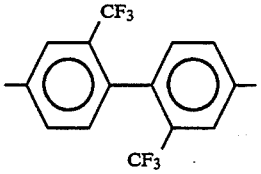

Z may also be optionally substituted with suitable substituents which do not substantially interfere with the imidization nor adversely affect final properties of the polyimide. Preferably the diamine is PDA, oxydianiline or benzidine. Suitably, the monohydrohalide salt of the diamine such as PDA is made by partially neutralizing the corresponding dihydrohalide salt. The dihydrohalide salt of PDA is commercially available in high purity.

Generally, it is desired in most applications that the ester form a polyimide with a rigid backbone to resist swelling and cracking. Suitable Q and Z groups to obtain such properties are disclosed above and those skilled in the art will know other suitable Q and Z groups to obtain these properties. Suitable polyamic alkyl esters formed in the process of the present invention will have a molecular weight of about 5000 to about 100,000, preferably about 10,000 to about 60,000.

Suitable bases for use in the process of the present invention include amines and tertiary amine ion exchange resins (free base form). Suitable amines include tertiary $C_{1-6}$ alkyl amines (e.g. tributylamine, triethylamine, and diethylmethylamine). Suitable ion exchange resins include styrene or divinylbenzene weak base resins sold by Dow Chemical Co. under the tradename Dowex 3-X4 or acrylic weak base resins sold by Rohm and Haas Co. under the tradename Duolite.

Suitably, the diamine (such as PDA dihydrohalide) and one equivalent of the base are dissolved in a suitable solvent such as N-methylpyrrolidone ("NMP"), dimethylacetamide or gamma-butyrolactone in a reaction vessel. The aromatic diester diacid halide and a stoichiometry amount of base are slowly added to the vessel while maintaining the temperature of the mixture below room temperature. The resulting polyamic ester can then be conveniently isolated by precipitation from water. The isolated polyamic ester can then be washed with water to remove any chloride contamination. The polyamic ester is inert towards water unlike the polyamic acid which undergoes chain cleavage with water.

The reaction of the monohydrohalide salt of PDA with aromatic diester diacid halide prevents the occurrence of chain branching with accompanying polymer property degradation which can occur when PDA is used as a reactant. Further, the monohydrohalide salt is soluble in the reaction solvent. The dihydrohalide salt of PDA is generally insoluble in the reaction solvent which results in poor polymer conversion, low molecular weight and bimodal distribution of molecular weight.

In most electronic applications, it is desired to form the polyamic ester as a film on a substrate. This may be accomplished by dissolving the polyamic ester product of the process of the present invention in a suitable organic solvent such as NMP, gamma butyrolactone, or dimethylacetamide and then coating a film on a substrate by art-known techniques such as spin or spray coating or doctor blading. The film can then be thermally imidized by heating it to an elevated temperature of from about 150° to 300° C. to form the polyimide film.

Examples of polyimides made using the process of the present invention include poly(p-phenylene biphenyltetracarboximide), poly [bis (trifluoromethyl) biphenylene pyromellitimide], poly [bis trifluoromethyl) biphenylene biphenyltetracarboximide ], poly (oxydiphenylene biphenyltetracarboximide), poly (p-phenylene oxydiphthalimide), poly(hexafluoroisopropylidene diphenylene biphenyl tetracarboximide) and copolymers thereof.

The present invention also relates to an integrated circuit such as a chip module, circuit chip or circuit board comprising a polyimide film made using the process of the present invention.

A preferred embodiment of the present invention relates to an integrated circuit packaging structure (chip module or carrier) for providing signal and power current to one or more integrated circuit chips comprising: (i) a substrate having electrical connecting means, for connection to a circuit board, (ii) a plurality of alternating electrically insulating and conducting layers positioned on the substrate wherein at least one of the layers comprises a polyimide film made using the process of the present invention and (iii) a plurality of vias for electrically interconnecting electrical connecting means, conducting layers and integrated circuit chip(s).

The integrated circuit packaging structure is an intermediate level of packaging between one or more integrated circuit chips and the circuit board. The integrated circuit chip(s) are mounted on the integrated circuit packaging structure which is in turn mounted on the circuit board.

The substrate of the packaging structure is generally an inert substrate such as a polymer, glass, silicon or ceramic. The substrate can optionally have integrated circuits disposed therein. The substrate is provided with electrical connecting means such as input/output pins (I/O pins) for electrically connecting the packaging structure to the circuit board. A plurality of electrically insulating and electrically conducting layers (layers having conductive circuits disposed in an insulating material) are alternatively stacked up on the substrate. The layers are generally formed on the substrate in a layer by layer process wherein each layer is formed in a separate process step. A least one of the layers comprises a polyimide film formed using the process of the present invention.

The packaging structure also comprises receiving means for receiving the integrated circuit chips. Suitable receiving means include pinboards for receipt of chip I/O pins or metal pads for solder connection to the chip. Generally, the packaging structure also comprises a plurality of electrical vias generally vertically aligned to electrically interconnect the I/O pins, the conductive layers and integrated circuit chips disposed in the receiving means. The function, structure and method of manufacture of the integrated circuit packaging-structure are well known to those skilled in the art as disclosed in U.S. Pat. Nos. 4,489,364; 4,508,981; 4,628,411 and 4,811,082, the disclosures of which are incorporated herein by reference.

The following example is a detailed description of methods of preparation and use of certain compositions of the present invention. The detailed preparations fall within the scope of, and serve to exemplify, the more generally described methods of preparation set forth above. The examples are presented for illustrative purposes only, and are not intended as a restriction on the scope of the invention.

EXAMPLE 1

A suspension of 1 mole of biphenyltetracarboxylic acid dianhydride (BPDA) in 1 liter of absolute ethanol was treated with 5 mmol of triethylamine and the mixture refluxed under argon with stirring for 6–7 hours. HPLC of an aliquot showed the absence of starting material and no evidence of triester. The ethanol was then distilled off under reduced pressure followed by sequential distillation of 5 volumes of ethyl acetate. The distillate was analyzed by GC for the absence of ethanol. When all the ethanol was gone from the distillate, the pot residue was diluted up to 1 liter with ethyl acetate. The mixture was heated to 57° C. and oxalyl chloride (3 moles) was added slowly. The temperature was maintained at 57° C. overnight. HPLC of a derivatized aliquot showed the absence of starting material and a 1:2:1 triplet for the diacid chloride. The excess oxalyl chloride was distilled off under reduced pressure followed by sequential distillation of 2 volumes of ethyl acetate. 1.02 mole of p-phenylenediamine dihydrochloride and 1.02 mole of tri-n-butylamine were mixed together in 2 liters of anhydrous NMP. The acid chloride solution was diluted up to 500 mL and slowly added to the cooled solution of the p-phenylenediamine monohydrochloride.

The addition rate was such that the temperature remained below 10° C. (ice/acetone bath). Approximately ¼ of the acid chloride was added before the onset of turbidity in the reaction mixture. Concurrent addition of tributylamine and acid chloride maintained homogeneity throughout the reaction. The reaction mixture was allowed to reach room temperature overnight. The polymer product was isolated by precipitation with high shear agitation in 10 volumes of water. The polymer product was washed in turn with 4 gallons each of 10% isopropanol/$H_2O$, $H_2O$, isopropanol, and ethyl acetate. The polymer product was dried in vacuo at 50° C. to yield 440 g (96%) of a very light yellow powder with an intrinsic viscosity of 0.706 dL/g. $M_w$=65,000.

Titrimetric analysis of the polymer product against silver ion found less than 15 ppm chloride.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A process for making polyamic ester comprising reacting an aromatic diester diacid halide with the monohydrohalide salt of phenylene diamine in the presence of a amine base.

2. The process of claim 1 wherein the aromatic diester diacid chloride is diethyl pyromellitate diacid chloride, diethyl biphenyltetracarboxylate diacid chloride, dimethyl biphenyltetracarboxylate diacid chloride, or di(methacryloxyethyl) biphenyltetracarboxylate diacid chloride.

* * * * *